United States Patent [19]
Mott

[11] 3,765,158
[45] Oct. 16, 1973

[54] MEANS FOR CONNECTING A BLADE TO A MOWER SHAFT
[75] Inventor: Carl W. Mott, Lake Ozark, Mo.
[73] Assignee: Mott Corporation, LaGrange, Ill.
[22] Filed: Dec. 28, 1970
[21] Appl. No.: 101,747

[52] U.S. Cl. .................................................. 56/294
[51] Int. Cl. ............................................ A01d 55/22
[58] Field of Search .................. 56/12.7, 289, 294, 56/504, 505

[56] References Cited
UNITED STATES PATENTS
| | | | |
|---|---|---|---|
| 3,411,279 | 11/1968 | Panik et al. | 56/294 |
| 3,527,038 | 9/1970 | Wood et al. | 56/12.7 X |
| 3,122,871 | 3/1964 | Frevik et al. | 56/12.7 X |
| 3,402,541 | 9/1968 | Panik et al. | 56/294 |
| 3,292,353 | 12/1966 | Woodring et al. | 56/294 |

FOREIGN PATENTS OR APPLICATIONS
| | | | |
|---|---|---|---|
| 1,144,611 | 3/1969 | Great Britain | 56/294 |

Primary Examiner—Louis G. Mancene
Assistant Examiner—J. A. Oliff
Attorney—Hibben, Noyes & Bicknell

[57] ABSTRACT

Means for connecting a blade to a mower shaft, comprising a member removably secured to the shaft and adapted to carry a blade which extends generally radially from the shaft when the shaft is rotated. The member is bifurcated, having a pair of arms embracing the shaft and may be pivotally secured thereto, and having a center portion joining the arms and to which a blade is adapted to be loosely secured. The member is secured in openings in the shaft by pin means which are either separate from, or integral with, the member. In the latter case, the member is elastically distorted from its normal shape to install the pin means of the member on the shaft, and the member then returns to its normal shape to retain the member on the shaft.

10 Claims, 13 Drawing Figures

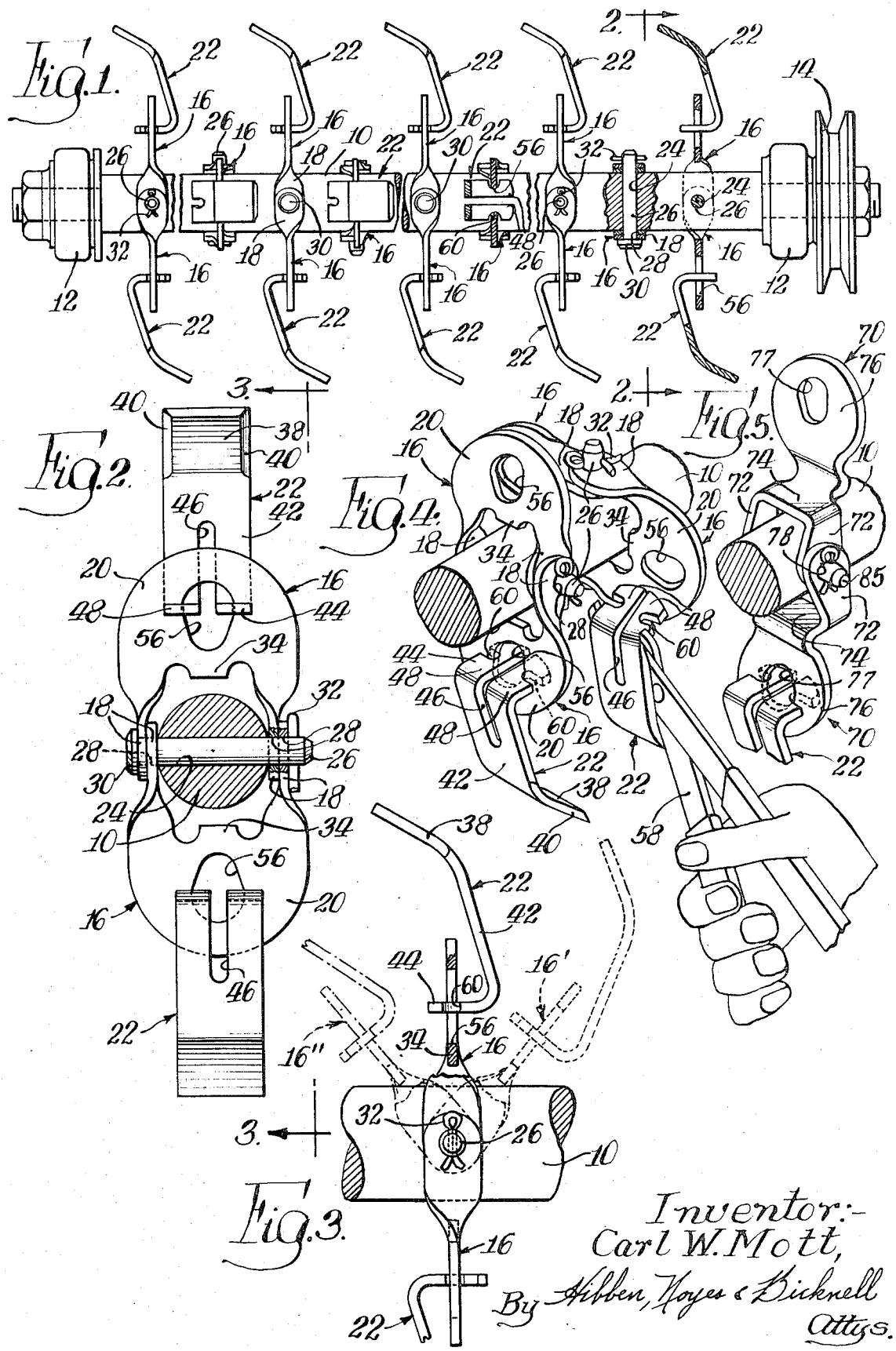

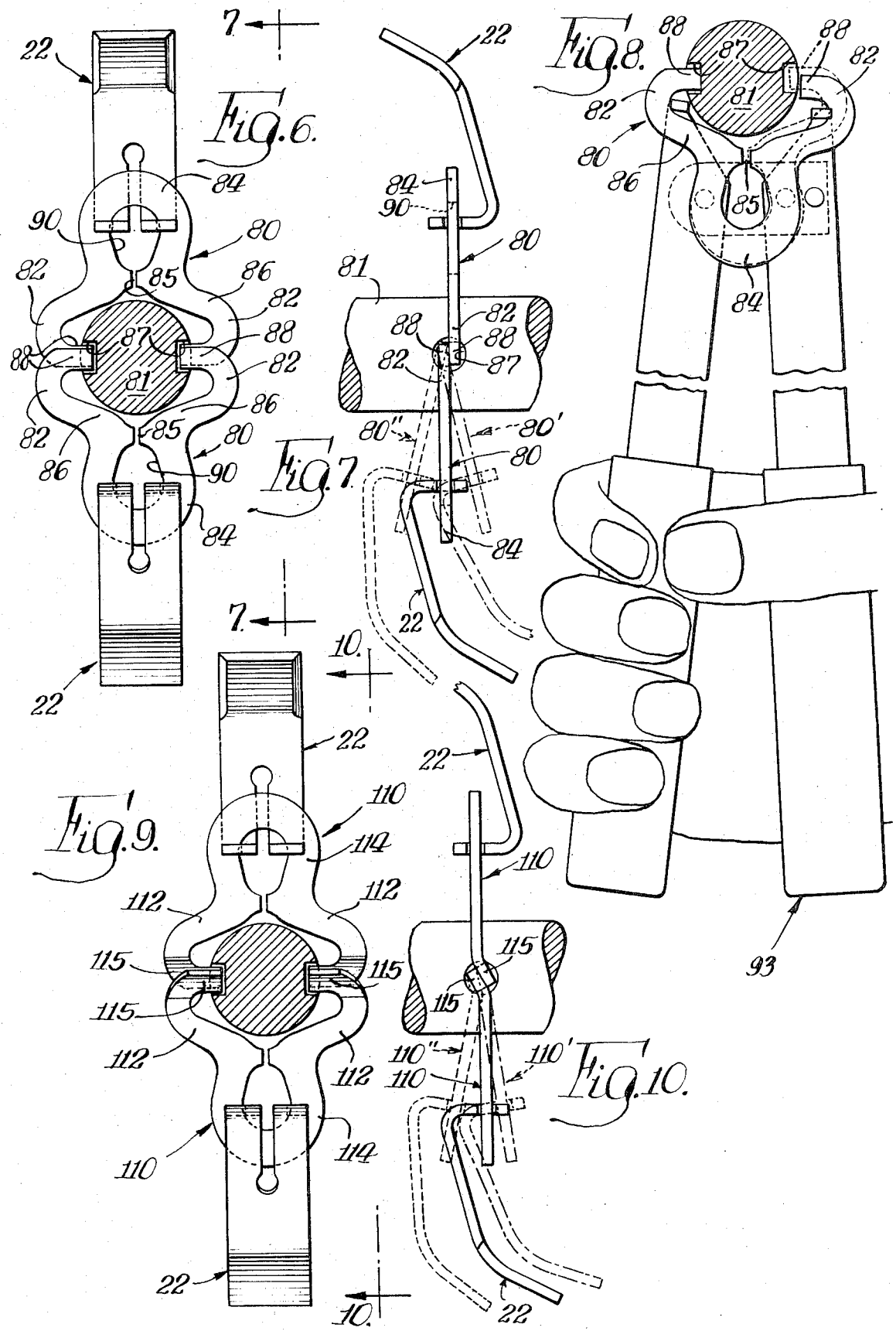

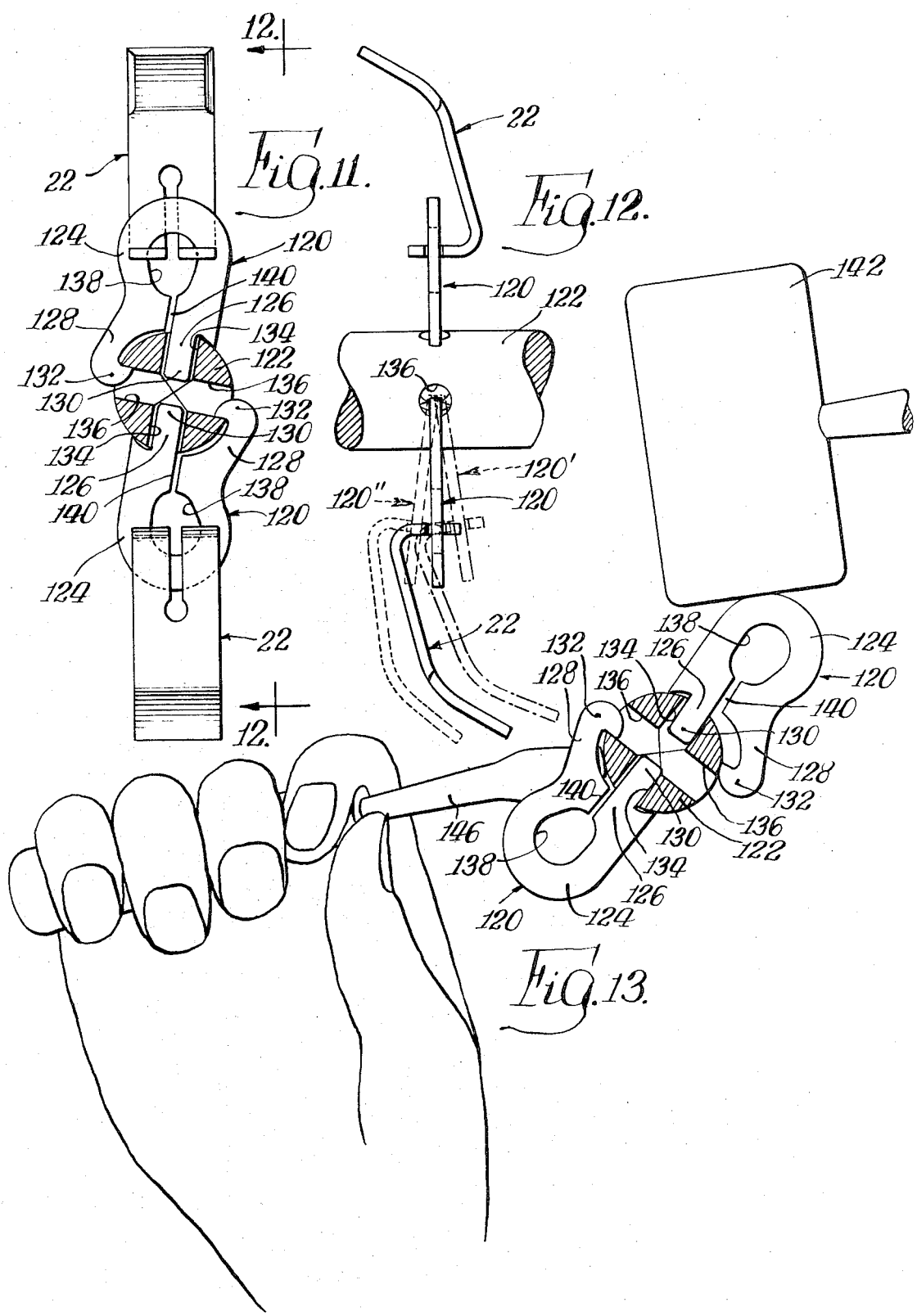

MEANS FOR CONNECTING A BLADE TO A MOWER SHAFT

This invention relates to mowers, and more particularly to a member connected to a mower shaft and adapted to carry a blade.

Many prior art mowers employ a rotatably driven shaft extending transverse of the direction of travel of the mower, and a plurality of axially spaced members mounted on the shaft. Secured to the members are a plurality of blades. The members extend generally radially from the shaft, and the blades carried by the members extend radially from the shaft when the mower is operating. Heretofore, such members or lugs were rigidly attached, as by welding, to the shaft. Such construction, because of the rigid attachment of the member to the shaft, has the disadvantage of being subject to breaking or bending of the member upon impact with a solid object such as a rock. Also, should one of the members be damaged, the shaft with all the members and blades had to be removed from the mower, and replacement of the member could be made only in a shop and not in the field.

The present invention has eliminated the rigid mounting of the members to the shaft, and because of doing so, has also eliminated the aforementioned disadvantages by providing a member which is removably secured to the shaft. Each member may also be so secured to the shaft that it may pivot relative thereto, and thus avoid damage upon impact. The member is bifurcated to provide arms embracing the shaft and a center portion joining the arms and adapted to carry a blade thereon. The arms are secured to the shaft by pin means and the member may have a limited range of pivotal movement. The pin means may be formed separate from the member or may be integral therewith. In the latter case the member is elastically distorted from its normal shape to install the pin means of the member on the shaft, and the member then returns to its normal shape to retain the member on the shaft.

Accordingly, it is the general object of the present invention to provide an improved means for connecting a mower blade to a mower shaft, which is simple and inexpensive to manufacture.

Another object of the present invention is to provide means for connecting a blade to a mower shaft, which pivots relative to the shaft to minimize damage to the member and to the blade upon either striking an object.

Still another object of the present invention is to provide a construction with which a damaged member may be readily removed and a new member substituted, in the field.

Other objects and advantages of the invention will become apparent from the following description and from the figures of the drawings in which:

FIG. 1 is a front elevational view of a mower shaft incorporating one embodiment of the present invention;

FIG. 2 is an enlarged cross sectional view taken on the line 2—2 of FIG. 1;

FIG. 3 is a fragmentary view taken on the line 3—3 of FIG. 2 with a portion broken away;

FIG. 4 is a perspective view of a portion of the shaft shown in FIG. 1, showing a blade mounted on one member and another blade being installed on another member;

FIG. 5 is a perspective view of a second embodiment of the invention;

FIG. 6 is a view similar to FIG. 2 but showing a third embodiment of the invention;

FIG. 7 is a fragmentary elevational view taken on the line 7—7 of FIG. 6;

FIG. 8 is a cross-sectional view of a shaft with a member of the character shown in FIG. 6 being installed on the shaft;

FIG. 9 is a view similar to FIG. 2 but showing a fourth embodiment of the invention;

FIG. 10 is a fragmentary elevational view taken on the line 10—10 of FIG. 9;

FIG. 11 is a view similar to FIG. 2 but showing a fifth embodiment of the invention;

FIG. 12 is a fragmentary elevational view taken on the line 12—12 of FIG. 11; and FIG. 13 is a cross-sectional view of a shaft with a member of the character shown in FIG. 11, being installed on the shaft and a similar member being removed from the shaft.

In FIG. 1 there is illustrated a mower shaft, indicated at 10, with which the blade connecting means of the invention may be used. The ends of the shaft 10 are mounted in a housing (not shown), and bearing structures 12 support the ends of the shaft. When the mower is in use, the shaft 10 is rotated, for example, by a belt (not shown) driving a pulley 14 mounted on the shaft 10.

The shaft 10 is, in this instance, circular in cross section, but may be of any cross section. Other than making provisions for the bearings 12, the pulley 14, and the shaft openings hereinafter described, little else need be done to make the mower shaft 10 from a rod of a commercially available shape.

On the shaft 10 at spaced intervals therealong are means for connecting mower blades to the shaft. In the first embodiment of the invention, said means comprises a plurality of members 16, each of which is one piece and rigid. Each member 16 is bifurcated or in the form of a yoke to provide arms 18 embracing the shaft 10. In the present instance, each member 16 is pivotally secured to the shaft 10. Connecting the arms 18 is a center portion 20 adapted to carry a blade 22. To pivotally attach the arms 18 to the shaft 10, diametrical hole 24 is provided in the shaft 10, and pin means, in this instance in the form of a separate pin 26, extends in holes 28 in the arms 18 and through the hole 24 in the shaft. The pin 26 is headed, as at 30, at one end is cross drilled at its other end to receive a cotter pin 32. At each such location, two identical members 16 are provided, one extending in one direction from the shaft, and the other in the opposite direction. Thus, a single pin 26 secures two members 16 to the shaft 10.

As shown in FIG. 2, the arms 18 of each member 16 lie in planes parallel to each other and the planes thereof are perpendicular to the plane of the center portion 20 of the member. Each member 16 is preferably punched from sheet metal, and the arms 18 are deformed or twisted relative to the center portion 20 so that the ends of the arms 18 are parallel for embracing the shaft. The arms 18 of one member 16 are in overlapping relation with the arms of the opposite member, as shown in FIG. 2. While the opposed members 16 are offset relative to each other because of the overlapping of the arms 18, the shaft 10 with the members 16 on it is still balanced.

As is shown in FIG. 3, each of the members 16 is movable relative to the shaft 10 since each member 16 can pivot about the pin 26, as is indicated by the positions thereof shown in broken lines at 16' and 16". The pivotal movement of the members 16 is in a plane parallel to the axis of the shaft 10 and is limited by a radially inward extending tab 34 on the center portion 20 which is adapted to engage the shaft 10. Should a member 16 be damaged, that member can be easily and individually replaced by removing the blade 22, the pin 26 and the damaged member, then installing a new member, and replacing the pin and either the old or a new blade if the latter is necessary.

The blades 22 are of the type described in my copending U. S. application, Ser. No. 75,347, filed Sept. 25, 1970 now U.S. Pat. No. 3,678,668, July 25, 1972. Each blade 22 has an outer end 38 having cutting edges 40, an intermediate portion 42 and an inner end 44. A slot 46 extends from the inner end 44 into the intermediate portion 42, and permits fingers 48, formed on the blade by the slot 46, to be compressed toward each other.

In the center portion 20 of the member 16 is formed an opening 56 in which the blade is secured. As is best shown in FIG. 2, the opening 56 is non-circular, as described in my copending application Ser. No. 75,347. The non-circular configuration of the opening 56 permits the blade 22 to be easily inserted into and freely swingable on a member 16 but yet permits the blade to be securely retained in the member.

The blade 22 is installed, as shown in FIG. 4, by compressing the fingers 48 with pliers 58, the blade 22 is inserted into the opening 56 of the member 16, and the blade 22 is then released from the pliers 58 so that notches 60 in the blade engage the margin of the opening 56.

A second embodiment of blade connecting means comprising a member 70 is illustrated in FIG. 5. The member 70 is also preferably formed from sheet metal and is bifurcated, or in the form of a yoke, to provide arms 72 and a center portion 74. The center portion 74 connects the arms 72, and has a radially extending outer portion 76. The arms 72 and center portion 74 are deformed or bent into the shape shown in FIG. 5.

The outer portion 76 has an opening 77 similar to the opening 56 for securing a blade 22 thereto. The arms 72 have holes 78 similar to the holes 28 for receiving a pin 85 for attaching the member 70 to the shaft. The member 70 can pivot relative to the shaft, and the pivoting movement is limited by engagement of the center portion 74 with the shaft.

In FIGS. 6-8, a third embodiment of blade connecting means embodying the features of the invention is illustrated. Each blade connecting means comprises a member 80 connected to a shaft 81 by a resilient portion on the member. The member 80 is bifurcated to provide arms 82 for connecting the member to the shaft 81, and a center portion 84 arranged to carry a blade 22. The member 80 is, preferably, formed from resilient sheet metal. The arms 82, as indicated at 86, extend generally outwardly tangentially relative to the shaft 81. The free ends, indicated at 88, of the arms 82 extend inwardly toward each other to enter diametrically opposite holes 87 formed in the shaft 81. The free ends 88 of the member 80 provide pin means on which the member 80 pivots, as will be herein described. The arms 82 extend from their free ends 88 and curve around the shaft, as indicated at 86, to join the center portion 84.

The center portion 84 is provided with an opening 90 for receiving a blade, which opening may be similar to the opening described in my above-mentioned copending application. In the center portion 84, between the arms 82 and the radially inner end of the opening 90, is a slot or shear 85 which facilitates distortion or spreading of the arms.

The openings 87 are sized so that there is clearance between the margins of the openings 87 and the ends 88 of the arms 82. The free ends 88 of the arms 82 are adapted to pivot in the openings 87 to permit pivotal movement of the member 80 on the shaft 81.

As is shown in FIG. 8, to connect or install a member 80 on the shaft 81, the arms 82 are distorted by spreading them apart from their normal shape (shown in dashed lines) to their distorted shape (shown in solid lines). To spread the arms 82 a pair of pliers 93 are utilized. Thus, when the arms 82 have been spread apart, one free end 88 of one of the arms 82 is then inserted in the openings 87 in the shaft 81. The member 80 is then swung so that the other free end 88 of the other arm 82 is positioned to enter the other opening 87, and the arms 82 are released from the pliers 93. The member 80 being resilient, the free ends 88 of the arms 82, after being released, snap back to their normal position (dashed lines) and are engaged in the openings 87 to pivotally retain the member 80 on the shaft 81. A second member 80 can be installed in the same pair of openings 87. The members 80 are flat and the arms 82 of the members 80, when secured to the shaft 81 will overlap.

As is shown in FIG. 7, the member 80 is free to pivot on the free ends 88 of the arms 82 in the openings 87 in the shaft 81, as is shown in dashed lines 80' and 80". Thus, if the blade 22 strikes a solid object, the member 80 will be caused to pivot away from the object, so that damage to the blade or to the member 80 is avoided.

In FIGS. 9 and 10, a fourth embodiment of blade connecting means is illustrated, and comprises a member 110 having arms 112 and a center portion 114 and is similar to the member 80, except that the pin means or free ends 115 of the arms 112 are bent or offset at an angle to the plane of the member 110, and are parallel to each other. Bending the free ends 115 of the arms 112 permits the center portions 114 of a pair of the members 110 to lie substantially in the same plane so as to maintain dynamic balance. As is shown in FIG. 10, upon striking a solid object each member 110 is free to move or pivot relative the shaft, as is shown in dashed lines 110' and 110".

In FIGS. 11-13, a fifth embodiment of blade connecting means of the invention is illustrated. This embodiment comprises a member 120 adapted to carry a blade, such as the blade 22, and to be connected by pin means to a shaft, such as the shaft 122. Each member 120 has a resilient portion permitting the member 120 to be distorted for installation on the shaft. The member 120 has a center portion 124 and is bifurcated to provide arms 126 and 128 which embrace the shaft. One of the arms 126 extends from the center portion 124 of the member 120 towards the center of the shaft and has a pin means or free end 130. The other arm 128 extends generally along the circumference of the shaft 122, but then turns toward the center of the shaft and has a pin means or free end 132. Thus, the free ends 130 and 132 of the arms 126 and 128 extend radially inward with respect to the shaft and are substantially perpendicular or 90° apart. The arms 126 and 128 engage in openings 134 and 136 in the shaft 122 to retain the member 120 on the shaft. Unlike the previous shafts, shaft 122 has openings 134 and 136 extending diametrically through the shaft.

In the center portion 124 of the member 120 is an opening 138, similar to the opening described in my abovementioned copending application. A slot or shear, indicated at 140, extends from the opening 138 and the inner edge of the member 120 adjacent the shaft 122 to facilitate spreading the arms 126 and 128.

As is shown in FIG. 13, the member 120 may be installed on the shaft 122 by various means such as by first engaging the free end 130 in the opening 134 and then forcing the member 120 to cause distortion of the member permitting the other free end 132 of the arm 128 to engage in the opening 136 of the shaft 122. After the free end 132 engages in the opening 136, the member 120 will snap back into its normal shape and thus secure the member 120 to the shaft 122. Such forcing of the member 120 may be accomplished by striking the member, as with a mallet 142. To remove a member 120, a wedge, such as a screwdriver 146, may be driven between the shaft 122 and the member as is shown in FIG. 13, or the wedge may be driven into the split 140 of the member 120 to force the free end 132 of the arm 128 out of the opening 136 in the shaft 122, and then the arm 126 may be removed from the opening 134.

As is shown in dashed lines 120' and 120'' in FIG. 12, the member 120 will pivot relative to the shaft 122, and the pivotal movement, in this instance, is limited by engagement of the member 120 with the shaft 122. The pivotal movement of the member 120 avoids the chance of damaging the member or the blade upon striking a solid object.

While the blade connecting means of the present invention, particularly members 80, 110 and 120, have been pivotally secured to the shaft, it should be understood that similar members, having pin means which can engage an opening in the shaft upon spreading or distortion of a resilient portion of the member from its normal position though non-pivotally secured to the shaft are within the scope of the present invention.

It is apparent from the foregoing that novel means for connecting a blade to a mower shaft has been provided. It is further apparent that said means comprises a member with pin means, and said member is pivotal relative to the shaft. Further, the member can be easily and individually replaced should such be necessary. The pin means may be a separate part from said member or may be an integral part of said member, in which case the member is resilient and may be distorted to allow the member to be secured on the shaft.

I claim:

1. In a mower having a mower shaft rotatable about an axis and said mower having blades, means for connecting one of said blades to said mower shaft comprising a one piece member at one end having an opening for receiving one of said blades therein, said member having at its other end means for pivotally securing said member directly to said shaft, said member being rotatable with said shaft, said member being pivotable about said other end on an axis transverse to the axis of said shaft.

2. In a mower having a mower shaft rotatable about an axis and said mower having blades, means for connecting one of said blades to said mower shaft comprising a member having a central portion with an opening therein for receiving said one blade and being bifurcated to provide a pair of arms extending from said central portion for directly embracing said shaft, said member being rotatable with said shaft, said arms being pivotable on an axis transverse to the axis of said shaft.

3. The mower of claim 2, wherein said shaft has an opening therein, and said arms have pin means extending into said opening for pivotally securing said member to said shaft.

4. The mower of claim 3, wherein said shaft has openings therein, and said arms are resilient and are distorted with respect to each other from a normal shape to permit installation of said pin means in said openings in said shaft.

5. The mower of claim 3, wherein said arms have openings therein, and said pin means extends through said openings in said arms and being adapted to extend into said opening in said shaft.

6. The mower of claim 5, wherein said arms are deformed relative to said central portion, said arms being parallel to each other and perpendicular to said central portion.

7. The mower of claim 3, wherein there are two of said pin means and both of said pin means are integral with the respective arms, said shaft having two openings, said member being distortable from a normal shape for engaging said two pin means in said shaft openings.

8. The mower of claim 7, wherein said pin means are opposed to and are substantially aligned with each other.

9. In a mower having a mower shaft rotatable about an axis and said mower having blades, means for connecting one of said blades to said mower shaft comprising a member having a central portion for receiving said one blade and being bifurcated to provide a pair of arms extending from said central portion, each arm having a free end, said free ends extending substantially perpendicularly to each other, said shaft having two openings for receiving said free ends, said member being distortable to engage said free ends in said shaft openings to secure said member to said shaft.

10. In a mower, a mower shaft member rotatable about an axis, a blade and means for connecting said blade to said shaft member, said means comprising a connecting member receiving said blade and having a pair of arms with free ends forming pin means extending substantially perpendicular to each other, said shaft having a pair of openings substantially perpendicular to each other, said connecting member being formed of resilient material having a degree of resiliency sufficient to permit distortion of the member to the extent that said pin means are engageable in said openings to retain said connecting member on said shaft member, said arms being distortably movable from a first position wherein said pin means engages in said openings to a second distorted position for removing said pin means from said openings.

* * * * *